US011001169B2

United States Patent
Jang et al.

(10) Patent No.: US 11,001,169 B2
(45) Date of Patent: May 11, 2021

(54) SEAT SWIVEL MECHANISM FOR VEHICLES

(71) Applicant: HYUNDAI TRANSYS INC., Seosan-si (KR)

(72) Inventors: Jae Yong Jang, Suwon-si (KR); Jae Sung Lee, Osan-si (KR); Soo Hwan Jeong, Anyang-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 56 days.

(21) Appl. No.: 16/530,189

(22) Filed: Aug. 2, 2019

(65) Prior Publication Data

US 2020/0198499 A1  Jun. 25, 2020

(30) Foreign Application Priority Data

Dec. 24, 2018 (KR) .......................... 10-2018-0168211

(51) Int. Cl.
| | |
|---|---|
| *B60N 2/02* | (2006.01) |
| *B60N 2/14* | (2006.01) |
| *B64D 11/06* | (2006.01) |
| *B63B 29/04* | (2006.01) |
| *B60N 2/24* | (2006.01) |

(52) U.S. Cl.
CPC ............ *B60N 2/0232* (2013.01); *B60N 2/14* (2013.01); *B60N 2/242* (2013.01); *B60N 2002/0236* (2013.01); *B63B 29/04* (2013.01); *B63B 2029/043* (2013.01); *B64D 11/0639* (2014.12)

(58) Field of Classification Search
CPC ........ B60N 2/0232; B60N 2/14; B60N 2/242; B60N 2/0224; B60N 2/143; B60N 2/146; B60N 2002/0236; B63B 29/04; B63B 2029/043; B64D 11/0639; B64D 11/06395
USPC ........................................ 297/344.21–344.23
See application file for complete search history.

(56) References Cited

U.S. PATENT DOCUMENTS

| | | | | |
|---|---|---|---|---|
| 4,600,239 A | * | 7/1986 | Gerstein | ................... A61G 3/06 248/425 |
| 4,846,529 A | * | 7/1989 | Tulley | .................. B60N 2/0232 297/344.23 |
| 6,168,234 B1 | * | 1/2001 | Haynes | .................. B60N 2/143 297/344.21 |
| 6,981,746 B2 | * | 1/2006 | Chung | ...................... A47C 3/18 248/425 |

(Continued)

FOREIGN PATENT DOCUMENTS

| | | |
|---|---|---|
| EP | 1772306 A2 | 4/2007 |
| EP | 2374654 A1 | 10/2011 |
| KR | 101809620 B1 | 1/2018 |

*Primary Examiner* — Mark R Wendell

(57) ABSTRACT

A seat swivel mechanism secured under a vehicle seat and configured to swivel the vehicle seat in a motor-driven manner is described. The seat swivel mechanism includes a lower plate, which is a fixed support body for supporting the swivel motion, and an upper plate rotatably secured on the lower plate. The upper plate and the lower plate are configured to rotate relative to each other, and the vehicle seat swivels due to the relative rotation of the upper plate and the lower plate. A driving motor is secured to any one of the upper plate and the lower plate, and an internal gear, which is secured to any one of the upper plate and the lower plate, is rotated by the driving motor, thereby swiveling the vehicle seat.

19 Claims, 6 Drawing Sheets

(56) References Cited

U.S. PATENT DOCUMENTS

| | | | | |
|---|---|---|---|---|
| 7,036,883 B1* | 5/2006 | Thompson | ............ | B60N 2/0224 |
| | | | | 297/344.24 |
| 8,585,146 B1* | 11/2013 | Giasson | ............. | B64D 11/0644 |
| | | | | 297/344.1 |
| 9,227,529 B2* | 1/2016 | Haller | .................... | B60N 2/062 |
| 9,579,995 B2* | 2/2017 | Haller | ..................... | B60N 2/16 |
| 9,663,001 B2* | 5/2017 | Haller | ..................... | B60N 2/08 |
| 2001/0038223 A1* | 11/2001 | Suga | ...................... | B60N 2/062 |
| | | | | 296/65.11 |
| 2007/0216209 A1* | 9/2007 | Kuenzel | .................. | B63B 29/06 |
| | | | | 297/344.12 |
| 2010/0102611 A1* | 4/2010 | Bunea | .................. | B64D 11/064 |
| | | | | 297/344.23 |
| 2013/0113258 A1* | 5/2013 | Slungare | ............. | B60N 2/1625 |
| | | | | 297/344.21 |
| 2015/0137572 A1* | 5/2015 | Auger | .................... | B60N 2/245 |
| | | | | 297/344.21 |
| 2017/0120776 A1* | 5/2017 | Slungare | .................. | B60N 2/06 |
| 2020/0101868 A1* | 4/2020 | Kim | ...................... | B60N 2/0232 |
| 2020/0317091 A1* | 10/2020 | Aktas | .................. | B60N 2/0232 |
| 2020/0353846 A1* | 11/2020 | Kish | ....................... | B60N 2/682 |

\* cited by examiner

SEAT SWIVEL MECHANISM FOR VEHICLES

CROSS-REFERENCE TO RELATED APPLICATION

This application claims under 35 U.S.C. § 119(a) the benefit of priority to Korean Patent Application No. 10-2018-0168211 filed on Dec. 24, 2018. The aforementioned priority application is hereby incorporated by reference in its entirety for all purposes.

BACKGROUND

(a) Technical Field

The present disclosure relates to a seat swivel mechanism for vehicles. More particularly, it relates to a seat swivel mechanism for vehicles, which allows a vehicle seat to swivel.

(b) Background Art

In general, seats in a vehicle are equipped with various convenience devices so that occupants can more comfortably and conveniently maintain a seated state. Among the convenience devices, a seat track device is installed so that a seat is able to move forwards or backwards to fit the body shape of an occupant, and a leg rest is installed to support the legs of the occupant.

Recently, as research and development has been conducted on autonomous vehicles, seats suitable for autonomous vehicles have also been developed. Particularly, seats for use in autonomous vehicles have been developed to provide occupants with various convenience modes, such as a conversation mode and a relaxation mode, as well as a normal driving mode.

As an example of seats for use in autonomous vehicles, there is a seat equipped with a swivel mechanism for swiveling the seat. Vehicle seats equipped with swivel mechanisms may be applied to the second row of seats of multi-purpose vehicles, autonomous vehicles, or the like.

However, most conventional swivel mechanisms applied to vehicle seats are configured to be manually operated by occupants. Thus, the conventional seat swivel mechanisms are inconvenient in that an occupant needs to manually pull a lever to swivel a seat. Further, because the conventional seat swivel mechanisms include a lever and a locking system, the structure thereof is complicated, and the weight of a vehicle is increased.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

Embodiments of the present disclosure has been made in an effort to solve the above-described problems associated with the prior art.

It is an object of the present disclosure to provide a motor-driven swivel mechanism, particularly, a power swivel mechanism that improves structural robustness by minimizing gaps in all directions.

An embodiment of the present disclosure may include a seat swivel mechanism for vehicles, including a lower plate, an upper plate installed to be rotatable relative to the lower plate, an internal gear secured to the upper plate, a driving gear meshing with the internal gear, and a motor configured to rotate the driving gear to swivel a vehicle seat secured to the upper plate.

The upper plate may include a circular-shaped gear-fixing hole formed in the center thereof, and the bottom surface of the internal gear may be attached and secured to the periphery of the gear-fixing hole.

The lower plate may include a gear insertion hole formed therein, and the motor may be installed to the bottom surface of the lower plate such that a motor shaft of the motor and the driving gear installed on the motor shaft protrude upwards from the lower plate through the gear insertion hole.

The upper plate may include a circular-shaped gear-fixing hole formed in the center thereof to fix the internal gear, and the driving gear may be exposed through the gear-fixing hole and may mesh with the internal gear.

The seat swivel mechanism may further include a cover bracket mounted to an upper portion of the internal gear and secured to the lower plate to press the top surface of the internal gear. The upper plate may be configured to be rotatable between the cover bracket and the lower plate.

The cover bracket may include a pressing portion formed along the periphery thereof to press the internal gear and an installation portion protruding from the center of the pressing portion toward the lower plate through the gear-fixing hole, and the bottom surface of the installation portion may be secured to the top surface of the lower plate using a fixing member.

The cover bracket may have a hat-shaped structure including a circular-shaped installation portion protruding from the pressing portion which has an annular-shape in a stepped manner, and the installation portion of the cover bracket may be secured to the top surface of the lower plate through the gear-fixing hole.

The cover bracket may include a motor-fixing hole formed in the pressing portion to allow the motor shaft of the motor to be rotatably secured thereto and a gear accommodation recess formed therein to accommodate the driving gear.

The internal gear may include an annular-shaped rib insertion groove formed in the top surface thereof in a circumferential direction, and a rib may be inserted into the rib insertion groove to reduce a gap in an upward-and-downward direction.

The rib may be exposed from the internal gear toward the cover bracket to prevent the cover bracket from directly contacting the internal gear.

The seat swivel mechanism may further include a guide member formed between the upper plate and the lower plate. The guide member may include a bracket insertion hole formed therein to allow the cover bracket to be inserted thereinto and may be configured to press the outer surface of the internal gear exposed toward the lower plate through the gear-fixing hole.

The guide member may have a structure capable of being tightened to adjust the diameter of the bracket insertion hole. As the guide member is tightened, the inner surface of the guide member may press the outer surface of the internal gear.

The guide member may include a cut portion formed in the outer periphery thereof, a receiving recess formed in one end of the cut portion, and an insertion protrusion formed on the opposite end of the cut portion. A degree to which the guide member is tightened may be adjusted by adjusting a position in the receiving recess to which the insertion protrusion is inserted.

The guide member may be assembled around the internal gear in a state in which both ends of the cut portion are spaced apart from each other, and may be secured to the top surface of the lower plate in a state in which the insertion protrusion is inserted into the receiving recess to bring the inner surface of the guide member into tight contact with the outer surface of the internal gear.

The lower plate may include a first flange hook formed at a portion of the outer periphery thereof, the upper plate may include a second flange hook formed at a portion of the outer periphery thereof, and the first flange hook may be engaged with the second flange hook.

The first flange hook may include a pair of first hook portions arranged at the outer periphery of the lower plate so as to face each other, the second flange hook may include a pair of second hook portions arranged at the outer periphery of the upper plate so as to face each other, and the second flange hook may be inserted into a space between the pair of first hook portions of the first flange hook and may be rotated to be engaged with the first flange hook.

The seat swivel mechanism may further include an elastic member configured to provide restoring force when the upper plate rotates.

The elastic member may be a spiral spring. The spiral spring may be secured at one end thereof to the lower plate and may be secured at the opposite end thereof to the upper plate.

The lower plate may be provided with a spring-fixing bracket installed at a position corresponding to the center of rotation of the upper plate. The one end of the spiral spring may be secured to the spring-fixing bracket. The internal gear may have a circular arc shape. The opposite end of the spiral spring may be secured to an end portion of the internal gear.

The elastic member may be maintained in a non-compressed state when a driving mode is a normal driving mode in which a vehicle seat is oriented forwards. When the upper plate rotates from the normal driving mode, the elastic member may be compressed. When the driving mode returns to the normal driving mode, the elastic member may provide restoring force.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of an embodiment of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
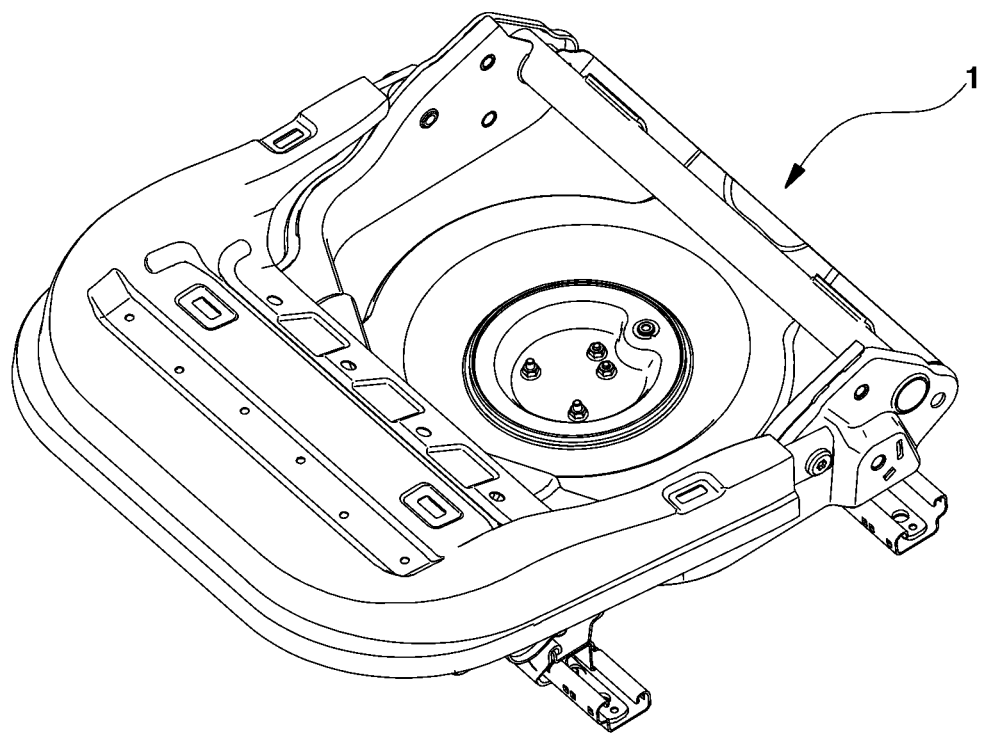
FIG. 1 is a perspective view showing a vehicle seat to which a seat swivel mechanism according to an exemplary embodiment of the present disclosure is installed.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, a seat swivel mechanism for vehicles according to exemplary embodiments of the present disclosure will be described in detail with reference to the accompanying drawings.

Figure 2:
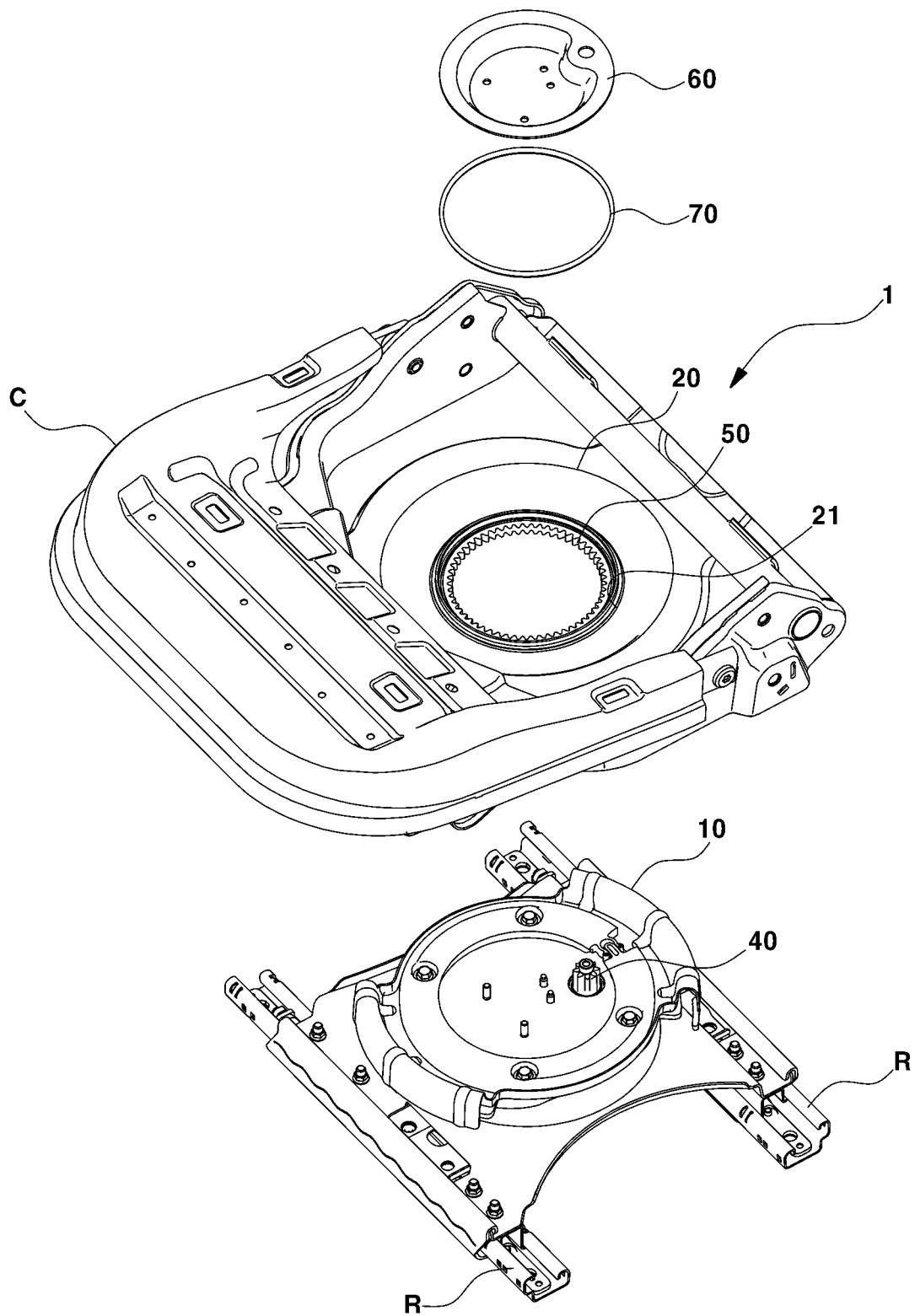
FIG. 2 is an exploded perspective view showing some components of the seat swivel mechanism according to the exemplary embodiment of the present disclosure.
Figure 3:
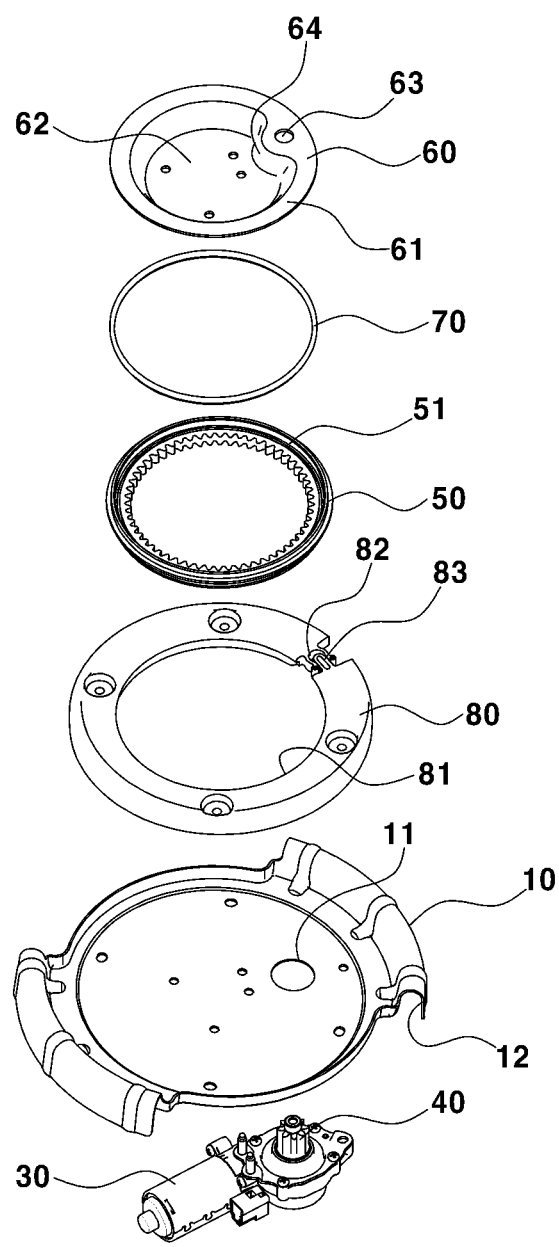
FIG. 3 is an exploded perspective view showing the components of the seat swivel mechanism according to the exemplary embodiment of the present disclosure, omitting an upper plate.
Figure 4:
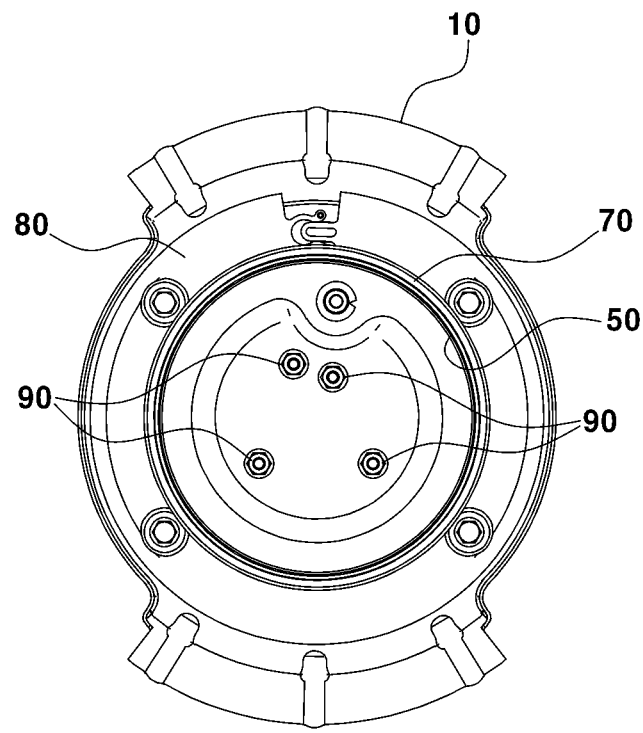
FIG. 4 is a view showing the assembled state of the components shown in FIG. 3.

FIG. 1 is a perspective view showing a vehicle seat to which a seat swivel mechanism according to an embodiment of the present disclosure is installed. FIGS. 2 and 3 are exploded perspective views showing the detailed configuration of the seat swivel mechanism according to the embodiment of the present disclosure. FIG. 4 is a view showing the assembled state of the components shown in FIG. 3.

A seat swivel mechanism according to the present disclosure is installed under the vehicle seat and swivels the vehicle seat in a motor-driven manner. Preferably, the seat swivel mechanism may include a lower plate 10, which is a fixed support body for supporting the swivel motion, and an upper plate 20 rotatably installed on the lower plate 10. The upper plate 20 and the lower plate 10 are configured to rotate relative to each other, and the vehicle seat swivels due to the relative rotation of the upper plate 20 and the lower plate 10. A driving motor 30 is installed to any one of the upper plate 20 and the lower plate 10, and an internal gear 50, which is installed to any one of the upper plate 20 and the lower plate 10, is rotated by the driving motor 30, thereby swiveling the vehicle seat.

Although a structure in which a seat swivel mechanism is installed on a double-rail structure R is disclosed in this specification, the disclosure is not limited thereto. Any one of various other installation structures may be used, so long as a lower plate 10 of the swivel mechanism can be fixedly installed. For example, the seat swivel mechanism according to an embodiment of the present disclosure may be applied to a single-rail structure. Further, the seat swivel mechanism does not necessarily need to be installed on a rail structure for movement in a forward-and-backward direction. The seat swivel mechanism may be directly installed on the vehicle body, so long as a lower plate 10 and/or a base can be fixedly installed.

As an exemplary embodiment of the present disclosure, the seat swivel mechanism will be described with reference to a structure in which a lower plate 10 thereof is fixedly installed on a double-rail structure R. Further, the seat swivel mechanism will be described with reference to a structure in which a driving motor 30 is installed to a lower plate 10, in which an internal gear 50 is installed to an upper plate 20, and in which the internal gear 50 meshes with a driving gear 40 connected to the motor 30. However, this is merely illustrative, and the installation positions of the internal gear 50 and the motor 30 may be appropriately varied within a range enabling relative rotation of the upper plate 20 and the lower plate 10.

As shown in FIGS. 1 to 4, a seat swivel mechanism 1 for vehicles according to an embodiment of the present disclosure includes a base installed on a double-rail structure R installed to a vehicle body or a vehicle, a lower plate 10 installed on the base, and an upper plate 20 rotatably installed on the lower plate 10 and connected to a seat. It is illustrated in FIG. 1 that the base is fixedly installed on the double-rail structure R and that the lower plate 10 is fixedly installed on the base. However, the base and the lower plate 10 may be integrally formed with each other. In this case, the lower plate 10 is actually installed on the double-rail structure R.

The constituent components of the seat swivel mechanism for vehicles according to an embodiment of the present disclosure are illustrated in detail in FIGS. 2 and 3. FIG. 2 illustrates the upper plate 20, a rib 70, a cover bracket 60, the lower plate 10 in an exploded manner in a state where the base and the lower plate 10 are installed on an upper rail of the double-rail structure R. A seat cushion part C is installed to the upper plate 20. The upper rail is installed on a lower rail so as to be able to move forwards and backwards. FIG. 3 illustrates the constituent components except the upper plate 20 in an exploded view. The constituent components are assembled between the lower plate 10 and the cover bracket 60, specifically, between an internal gear 50 and a guide member 80 when viewed from a side of the seat, as shown in a cross-sectional view of FIG. 5.

Referring to FIGS. 2 and 3, the seat swivel mechanism for vehicles according to an embodiment of the present disclosure includes a lower plate 10, a motor 30, and an upper plate 20. The lower plate 10 is actually secured to the vehicle body. The motor 30 is installed to the lower plate 10 to rotate a driving gear 40. An internal gear 50 configured to mesh with the driving gear 40 is secured to the upper plate 20. In addition, the seat swivel mechanism may further include a rib 70 and a guide member 80 in order to reduce gaps in all directions in the assembled structure of the upper plate 20 and the lower plate 10. In addition, a cover bracket 60 is coupled to the lower plate 10, with the upper plate 20 interposed therebetween, so that the upper plate 20 and the lower plate 10 are securely coupled to each other so as to be rotatable relative to each other.

Specifically, the seat swivel mechanism for vehicles according to an exemplary embodiment of the present disclosure may include a lower plate 10, an upper plate 20 rotatably installed on the lower plate 10, an internal gear 50 secured to the upper plate 20, a driving gear 40 meshing with the internal gear 50, and a motor 30 secured to the upper plate 20, configured to rotate the driving gear 40 to swivel the vehicle seat.

In particular, a circular-shaped gear-fixing hole 21 is formed in the center of the upper plate 20, and the bottom surface of the internal gear 50 is attached and secured to the periphery of the gear-fixing hole 21. In addition, a gear insertion hole 11 is formed in the lower plate 10. The motor 30 is installed to the bottom surface of the lower plate 10 such that the motor shaft of the motor 30 and the driving gear installed on the motor shaft protrude upwards from the lower plate 10 through the gear insertion hole 11. The driving gear 40 is exposed upwards from the lower plate 10 through the gear-fixing hole 21, and the exposed driving gear 40 meshes with the teeth formed along the inner surface of the internal gear 50.

As shown in FIGS. 2 and 3, the internal gear 50 of an embodiment of the present disclosure is an annular-shaped gear that has a plurality of teeth formed along the inner surface thereof. The internal gear 50 meshes with the driving gear 40, which is located inside the internal gear 50. As the motor 30 rotates the driving gear 40, the internal gear 50 rotates, and the upper plate 20, to which the internal gear 50 is secured, also rotates together therewith. That is, the seat swivel mechanism for vehicles according to this embodiment is configured such that the upper plate 20 is rotated by the driving of the motor 30. As the seat cushion part, which is installed to the upper plate 20, rotates, the vehicle seat also rotates together therewith.

A cover bracket 60 may be mounted to an upper portion of the internal gear 50 and be secured to the lower plate 10 so as to press the top surface of the internal gear 50. The cover bracket 60 is installed on the lower plate 10, and functions as a pivot when the internal gear 50 and the upper plate 20 rotate. That is, as shown in FIG. 2, the lower plate 10 and the cover bracket 60 are secured to each other using fixing members 90, such as a bolt and a nut, and thus form the center of rotation of the upper plate 20. Further, since the outer periphery of the internal gear 50 is pressed by the cover bracket 60, the internal gear 50 is rotatable between the lower plate 10 and the cover bracket 60.

Specifically, the cover bracket 60 includes a pressing portion 61, which is formed along the periphery thereof in order to press the internal gear 50, and an installation portion 62, which protrudes from the center of the pressing portion 61 toward the lower plate 10 through the gear-fixing hole 21. The bottom surface of the installation portion 62 may be secured to the top surface of the lower plate 10 using the fixing members 90. For example, the cover bracket 60 may have a reverse hat-shaped structure, in which a circular-shaped installation portion 62 protrudes from the annular-shaped pressing portion 61 in a stepped manner. The installation portion 62 of the cover bracket 60 may be formed so as to be secured to the top surface of the lower plate 10 through the gear-fixing hole 21.

In addition, a motor-fixing hole 63 may be formed in the pressing portion 61 of the cover bracket 60, to which the motor shaft of the motor 30 is rotatably secured. A gear accommodation recess 64 may be formed in the cover bracket 60 in order to accommodate the driving gear 40 therein.

An exemplary embodiment of the present disclosure may include components for ensuring the structural stability of the internal gear 50 and the upper plate 20, which are provided so as to be rotatable, by minimizing gaps in all directions.

Specifically, an annular-shaped rib insertion groove 51 is formed in the top surface of the internal gear 50 in the circumferential direction of the internal gear 50, and the rib 70 is inserted into the rib insertion groove 51 in order to reduce a gap in the upward-and-downward direction. The rib 70 is formed such that a portion thereof is inserted into the rib insertion groove 51 and another portion thereof is exposed from the internal gear 50 toward the cover bracket 60. That is, in the state of insertion into the rib insertion groove 51, the rib 70 protrudes from the top surface of the internal gear 50 toward the cover bracket 60. Thus, the cover bracket 60 does not directly contact the top surface of the internal gear 50, but directly contacts the rib 70. The rib 70 may be made from plastic. It is possible to minimize a gap in the upward-and-downward direction by inserting the plastic rib between the cover bracket 60 and the internal gear 50. Thus, it is possible to prevent the seat cushion part C from excessively moving upwards and downwards when the upper plate 20 rotates or moves forwards and backwards along the rail.

In addition, in order to reduce a gap in the leftward-and-rightward direction, the seat swivel mechanism for vehicles according to an embodiment of the present disclosure may include a tightening-type guide member 80. FIG. 3 illustrates the concrete configuration of the tightening-type guide member 80.

Described in detail, the guide member 80 is inserted between the upper plate 20 and the lower plate 10, and is installed around the outer periphery of the internal gear 50 so as to press the outer surface of the internal gear 50. That is, the guide member 80 may have an annular-shaped structure that can be adjusted in diameter. The guide member 80 is brought into tight contact with the internal gear 50 by reducing the diameter of the guide member 80 so as to be biased toward the internal gear 50. At this time, since the guide member 80 is secured to the lower plate 10, a gap in the leftward-and-rightward direction between the lower plate 10 and the upper plate 20 may be actually reduced.

The guide member 80 has a bracket insertion hole 81 formed in the center thereof, through which the cover bracket 60 is inserted, and presses the outer surface of the internal gear 50, which is exposed toward the lower plate 10 through the gear-fixing hole 21.

For example, the guide member 80 has a structure that is capable of being tightened so as to adjust the diameter of the bracket insertion hole 81. As the guide member 80 is tightened, the inner surface of the guide member 80 presses the outer surface of the internal gear 50.

In greater detail, as shown in FIG. 3, the guide member 80 has a cut portion formed in the outer periphery thereof. A receiving recess 82 is formed in one end of the cut portion, and an insertion protrusion 83 is formed on the opposite end of the cut portion. The degree to which the guide member 80 is tightened is adjusted by adjusting the position in the receiving recess 82 to which the insertion protrusion 83 is inserted.

As shown in FIG. 3, the receiving recess 82 may be configured such that, as the insertion protrusion 83 is inserted into the receiving recess 82, the receiving recess 82 is gradually spread so as to receive the insertion protrusion 83 therein. A worker may provisionally fix the insertion protrusion 83 by pushing one side of the guide member 80 so that the insertion protrusion 83 is inserted into the receiving recess 82. That is, in order to temporarily fix the position of the insertion protrusion 83, the internal width of the receiving recess 82 may be set to be smaller than the width of the insertion protrusion 83, and the receiving recess 82 may be formed so as to be elastically spread.

The structure of the guide member 80 will be described below in more detail with reference to the method of assembling the guide member 80. The guide member 80 may be assembled around the internal gear 50 in the state in which both ends of the cut portion of the guide member 80 are spaced apart from each other. Thereafter, one end of the cut portion of the guide member 80 may be pressed so that the insertion protrusion 83 is sufficiently inserted into the receiving recess 82 and thus the inner surface of the guide member 80 comes into tight contact with the outer surface of the internal gear 50. In this pressed state, the guide member 80 may be secured to the lower plate 10 using a fastening member such as a bolt.

Figure 5:
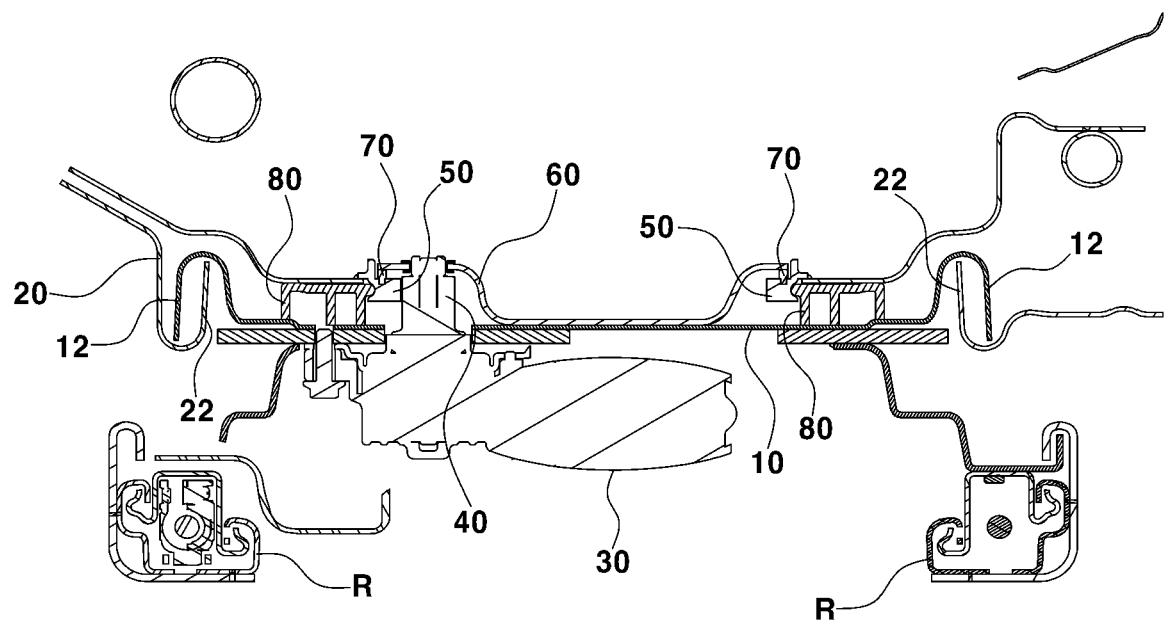
FIG. 5 is a cross-sectional view of the seat swivel mechanism according to the exemplary embodiment of the present disclosure.

FIG. 5 is a cross-sectional view of the seat swivel mechanism according to an exemplary embodiment of the present disclosure, which has reduced gaps in all directions. It is confirmed that the gaps are greatly reduced in all directions by the rib 70 and the guide member 80.

Next, the coupling structure of the upper plate 20 and the lower plate 10 for improving the performance of enduring collisions will be described. FIG. 5 shows the cross-section of the seat swivel mechanism for vehicles according to an embodiment of the present disclosure, particularly, the structure in which the upper plate 20 and the lower plate are coupled to each other via flange hooks.

Described in detail, as shown in FIG. 5, the lower plate 10 is provided with a first flange hook 12 at a portion of the outer periphery thereof, and the upper plate 20 is provided with a second flange hook 22 at a portion of the outer periphery thereof so as to be engaged with the first flange hook 12. Here, the flange hook is a hook-shaped flange that is formed at the outer periphery of each of the upper plate 20 and the lower plate 10. That is, the end portion of the flange has a hook shape. The first flange hook 12 of the lower plate 10 and the second flange hook 22 of the upper plate 20 are formed in mutually reversed shapes in the upward-and-downward direction. Thus, the upper plate 20 and the lower plate 10 are coupled to each other in such a manner that the second flange hook 22 and the first flange hook 12 are engaged with each other. Therefore, the engagement between the second flange hook 22 and the first flange hook 12 may prevent the upper plate 20 and the lower plate 10 from being separated from each other in the event of a collision.

Preferably, the first flange hook 12 may include a pair of hook portions arranged at the outer periphery of the lower plate 10 so as to face each other, and the second flange hook 22 may include a pair of hook portions arranged at the outer periphery of the upper plate 20 so as to face each other. In this case, when the lower plate 10 and the upper plate 20 are assembled, the second flange hook 22 is inserted into the space between the pair of hook portions of the first flange hook 12, and is then rotated to be moved to the first flange hook 12, whereby the first flange hook 12 and the second flange hook 22 overlap each other and are engaged with each other.

Meanwhile, the seat swivel mechanism may further include an elastic member for applying restoring force to the upper plate 20 when the upper plate 20 rotates. Another embodiment including the elastic member is illustrated in FIGS. 6A and 6B.

Figure 6A:
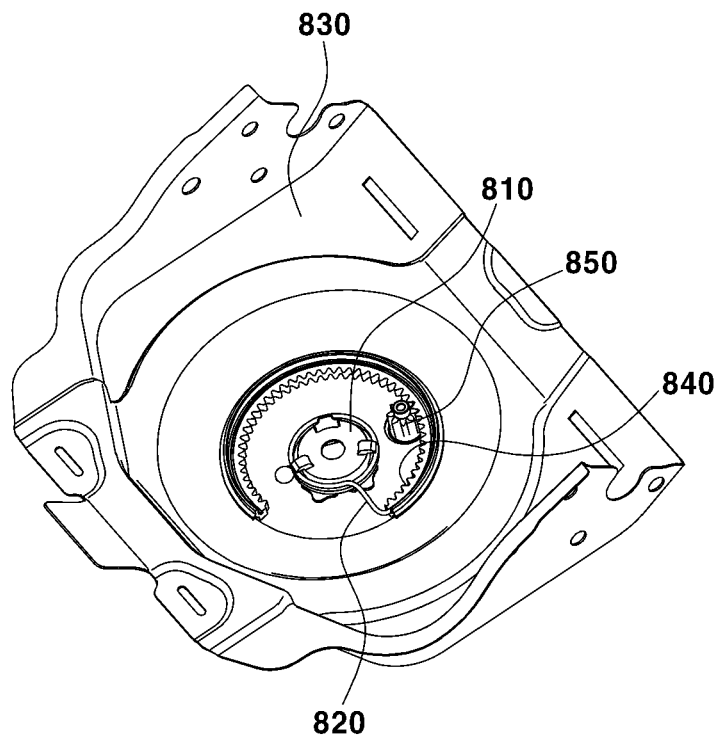
FIGS. 6A and 6B are perspective views showing a seat swivel mechanism for vehicles including an elastic member according to another embodiment of the present disclosure.
Figure 6B:
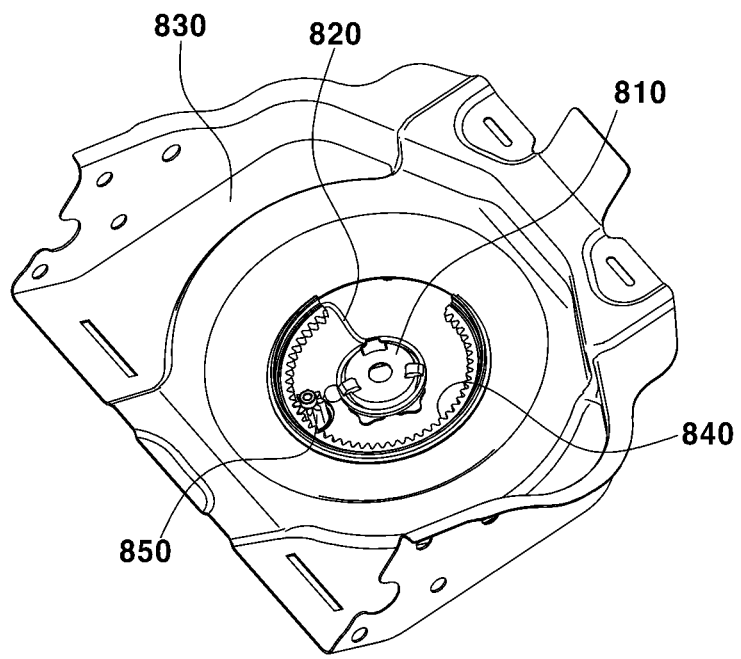

Specifically, FIG. 6A shows a normal driving mode, in which the vehicle seat faces the front glass of the vehicle, and FIG. 6B shows the situation in which the vehicle seat is rotated 180 degrees to face the rear seat of the vehicle.

According to an exemplary embodiment of the present disclosure, the elastic member is maintained in a free mode, i.e. in a state in which no load is applied thereto, in the normal driving mode. On the other hand, when the seat rotates due to the operation of the swivel mechanism, the elastic member is compressed.

Specifically, the elastic member may be a spiral spring 820. The spiral spring 820 may be secured at one end thereof to the lower plate and may be secured at the opposite end thereof to the upper plate 830.

Figure 7A:
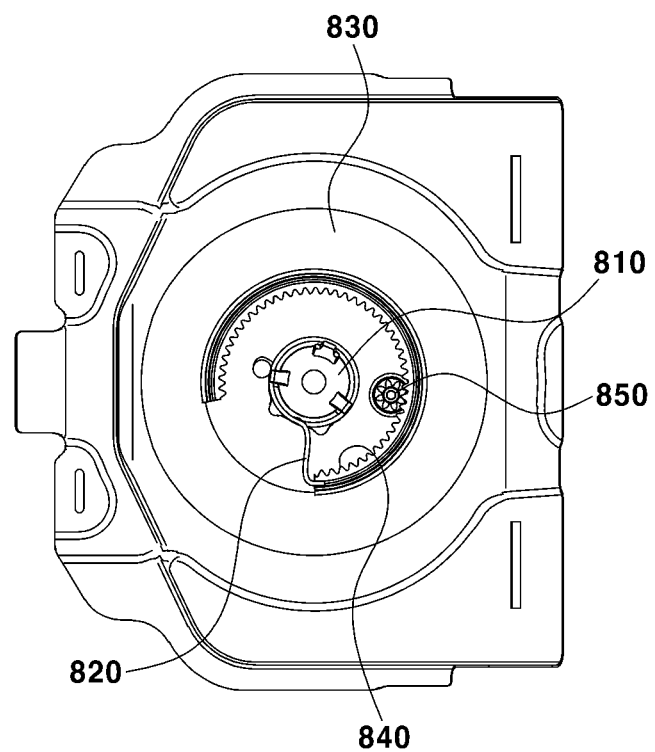
FIGS. 7A and 7B are views showing the major components of the seat swivel mechanism for vehicles including the elastic member.
Figure 7B:
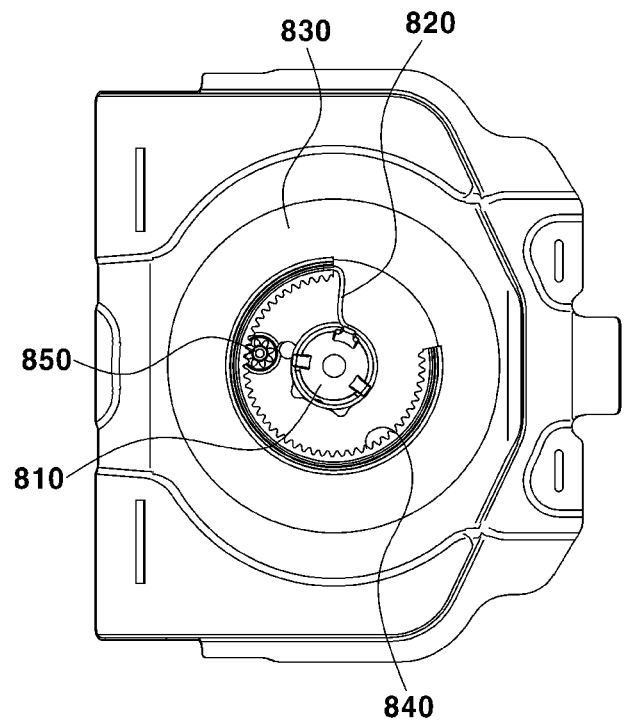

In greater detail, as shown in FIGS. 7A and 7B, a spring-fixing bracket 810 may be installed at a position in the lower plate that corresponds to the center of rotation of the upper plate 20, and one end of the spiral spring 820 may be secured to the spring-fixing bracket 810. The internal gear 840 may have a circular arc shape, and the opposite end of the spiral spring may be secured to the end portion of the internal gear 840. In addition, the internal gear 840 meshes with the driving gear 850 installed to the motor. However, as shown in FIG. 7A, the spiral spring may be directly attached to the upper plate 830.

Thus, in the normal driving mode, in which the vehicle seat is oriented forwards, the elastic member is maintained in a non-compressed state. When the upper plate 830 rotates from the normal driving mode, the elastic member is compressed. When the vehicle returns to the normal driving mode, the elastic member provides restoring force. Specifically, when the vehicle seat swivels to be oriented backwards due to, for example, a mode change from the normal driving mode to the autonomous driving mode, a load is increasingly applied to the motor in proportion to the degree to which the spiral spring 820 is compressed, and accordingly, the swivel speed of the vehicle seat becomes low. On the other hand, when the vehicle seat swivels to be oriented forwards due to, for example, a mode change from the autonomous driving mode to the normal driving mode, the spiral spring exerts restoring force in the same direction as the rotation direction of the vehicle seat, and thus the load applied to the motor is reduced, leading to an increase in the swivel speed of the vehicle seat. Therefore, the vehicle seat returns rapidly to the original position, corresponding to the normal driving mode, from the position corresponding to the autonomous driving mode in an emergency.

As is apparent from the above description, according to the seat swivel mechanism for vehicles according to an embodiment of the present disclosure, the seat swivel operation is realized by the operation of an internal gear and a driving motor. Therefore, it is possible to constitute the seat swivel mechanism without a separate lever and a separate locking system. As a result, the seat swivel mechanism according to an embodiment of the present disclosure has a simple structure and also contributes to a reduction in the weight of a vehicle compared to a conventional manually operated swivel mechanism.

In addition, it is possible to sufficiently secure the performance of enduring collisions in a forward-and-backward direction by minimizing a gap in the swivel mechanism in an upward-and-downward direction.

In addition, in an emergency in which a driving mode needs to be rapidly changed from the autonomous driving mode to the normal driving mode, the vehicle seat, which has swiveled to a certain position in the autonomous driving mode, is capable of more quickly returning to the original position, corresponding to the normal driving mode, due to an elastic member that assists in swiveling the vehicle seat.

That is, the seat swivel mechanism according to an embodiment of the present disclosure is capable of promptly responding to an emergency situation of an autonomous vehicle.

The disclosure has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A seat swivel mechanism for vehicles, comprising:
a lower plate;
an upper plate rotatably secured on the lower plate;
an internal gear secured to the upper plate;
a driving gear meshing with the internal gear; and
a motor secured to the lower plate for rotating the driving gear to swivel a vehicle seat secured on the upper plate, wherein a circular-shaped gear-fixing hole is in the center of the upper plate, and
wherein the internal gear is secured to a periphery of the circular-shaped gear-fixing hole.

2. The seat swivel mechanism of claim 1, wherein a gear insertion hole is in the lower plate, and
wherein the motor is secured to a bottom surface of the lower plate such that a motor shaft of the motor and the driving gear secured on the motor shaft protrude upwards from the lower plate through the gear insertion hole.

3. The seat swivel mechanism of claim 2, wherein a circular-shaped gear-fixing hole is in the center of the upper plate to fix the internal gear, and
wherein the driving gear is exposed through the circular-shaped gear-fixing hole and meshes with the internal gear.

4. The seat swivel mechanism of claim 1, further comprising:
a cover bracket secured on the lower plate to press a top surface of the internal gear,
wherein the internal gear is configured to be rotatable between the cover bracket and the lower plate, and
wherein the upper plate securing the internal gear is configured to be rotatable as the internal gear is configured to be rotatable.

5. The seat swivel mechanism of claim 4, wherein the cover bracket comprises a pressing portion and an installation portion,
wherein the pressing portion is disposed along a periphery of the installation portion to press the top surface of the internal gear,
wherein the installation portion protrudes from the center of the pressing portion toward the lower plate through the circular-shaped gear-fixing hole, and
wherein a bottom surface of the installation portion is secured to a top surface of the lower plate using a fixing member.

6. The seat swivel mechanism of claim 4, wherein the cover bracket has a reverse hat-shaped structure comprising a substantially circular-shaped installation portion and a pressing portion,
wherein the substantially circular-shaped installation portion protrudes from the pressing portion which has an annular-shape in a stepped manner, and
wherein the substantially circular-shaped installation portion is secured to a top surface of the lower plate through the circular-shaped gear-fixing hole.

7. The seat swivel mechanism of claim 5, wherein the cover bracket further comprises a motor-fixing hole and a gear accommodation recess,
 wherein the motor-fixing hole is disposed in the pressing portion to allow a motor shaft of the motor to be rotatably secured to the pressing portion, and
 wherein the gear accommodation recess is configured to accommodate the driving gear secured on the motor shaft.

8. The seat swivel mechanism of claim 4, wherein an annular-shaped rib insertion groove is in a top surface of the internal gear in a circumferential direction of the internal gear, and
 wherein a rib is inserted into the rib insertion groove to reduce a gap in an upward-and-downward direction relative to the internal gear.

9. The seat swivel mechanism of claim 8, wherein the rib is exposed from the internal gear toward the cover bracket to prevent the cover bracket from directly contacting the internal gear.

10. The seat swivel mechanism of claim 4, further comprising:
 a guide member disposed between the upper plate and the lower plate,
 wherein a bracket insertion hole is in the guide member to allow the cover bracket to be inserted in the guide member, and
 wherein the guide member is configured to press an outer surface of the internal gear exposed toward the lower plate through the circular-shaped gear-fixing hole.

11. The seat swivel mechanism of claim 10, wherein the guide member has a structure configured to adjust a diameter of the bracket insertion hole, and
 wherein, as the guide member reduces the diameter of the bracket insertion hole, an inner surface of the guide member presses the outer surface of the internal gear.

12. The seat swivel mechanism of claim 11, wherein a cut portion is in an outer periphery of the guide member,
 wherein a receiving recess is in one end of the cut portion,
 wherein an insertion protrusion is on an opposite end of the cut portion, and
 wherein the guide member adjusts a diameter of the bracket insertion hole by adjusting a position of the insertion protrusion inserted in the receiving recess.

13. The seat swivel mechanism of claim 12, wherein the guide member is assembled around the internal gear such that the one end of the cut portion and the opposite end of the cut portion are spaced apart from each other, and
 wherein the guide member is secured to a top surface of the lower plate such that the insertion protrusion is inserted into the receiving recess to bring the inner surface of the guide member into tight contact with the outer surface of the internal gear.

14. The seat swivel mechanism of claim 1, wherein a first flange hook is disposed at a portion of an outer periphery of the lower plate,
 wherein a second flange hook is disposed at a portion of an outer periphery of the upper plate, and
 wherein the first flange hook is engaged with the second flange hook.

15. The seat swivel mechanism of claim 14, wherein the first flange hook comprises a first shank and a first barb arranged at the outer periphery of the lower plate, the first shank and the first barb facing each other,
 wherein the second flange hook comprises a second shank and a second barb arranged at the outer periphery of the upper plate, the second shank and the second barb facing each other, and
 wherein the second barb of the second flange hook is inserted into a space between the first shank and the first barb of the first flange hook and is rotated to be engaged with the first flange hook.

16. The seat swivel mechanism of claim 1, further comprising:
 an elastic member secured on the lower plate and the upper plate, the elastic member configured to provide restoring force when the upper plate rotates.

17. The seat swivel mechanism of claim 16, wherein the elastic member is a spiral spring,
 wherein one end of the spiral spring is secured to the lower plate, and
 wherein an opposite end of the spiral spring is secured to the upper plate.

18. The seat swivel mechanism of claim 17, wherein a spring-fixing bracket is on the lower plate to be disposed at the center of the internal gear,
 wherein the one end of the spiral spring is secured to the spring-fixing bracket,
 wherein the internal gear has a circular arc shape, and
 wherein the opposite end of the spiral spring is secured to an end portion of the internal gear.

19. The seat swivel mechanism of claim 16, wherein the elastic member is maintained in a non-compressed state when the vehicle seat is oriented forwards,
 wherein, when the upper plate rotates and the vehicle seat is oriented backwards, the elastic member is compressed, and
 wherein, when the vehicle seat returns to being oriented forwards, the elastic member provides restoring force.

* * * * *